July 27, 1943.  T. D. THOMPSON ET AL  2,325,573
VISCOSITY RESPONSIVE APPARATUS
Filed Nov. 26, 1938  4 Sheets-Sheet 2
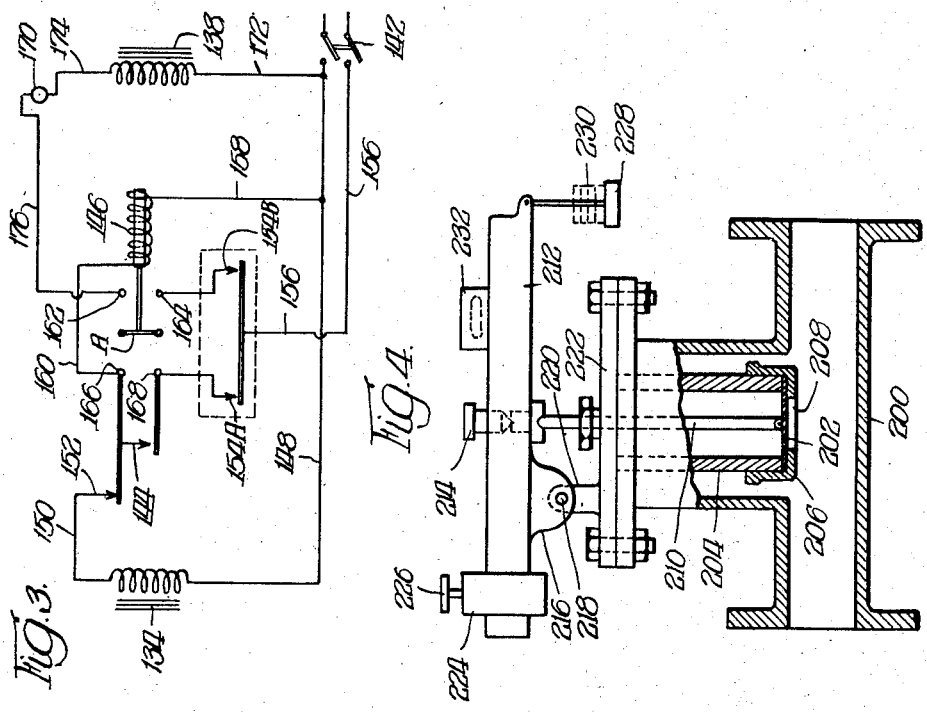
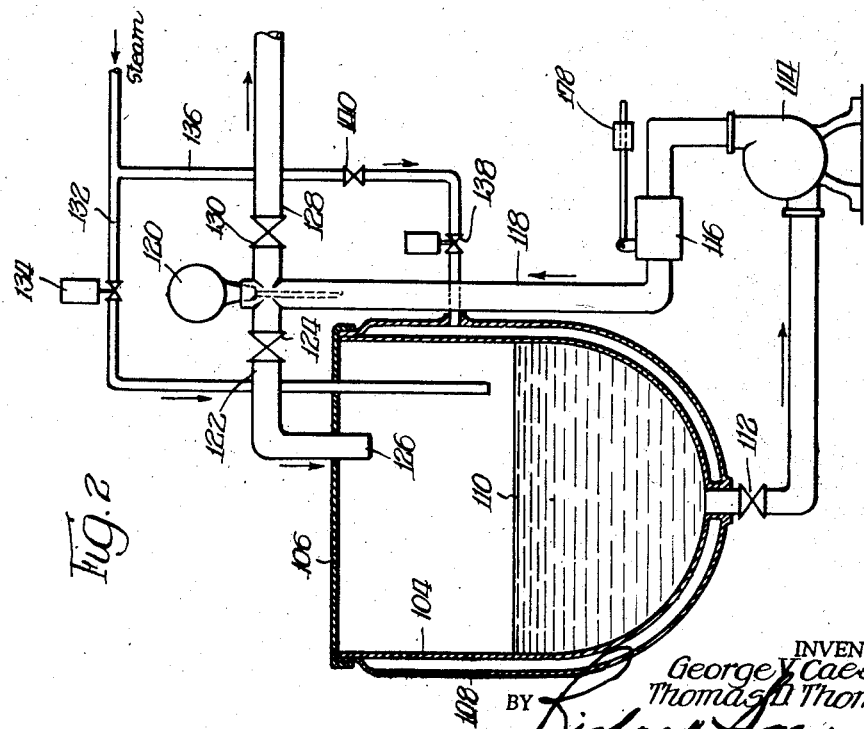
INVENTORS.
George V. Caesar,
Thomas D. Thompson,
BY Richard Spencer
ATTORNEY.

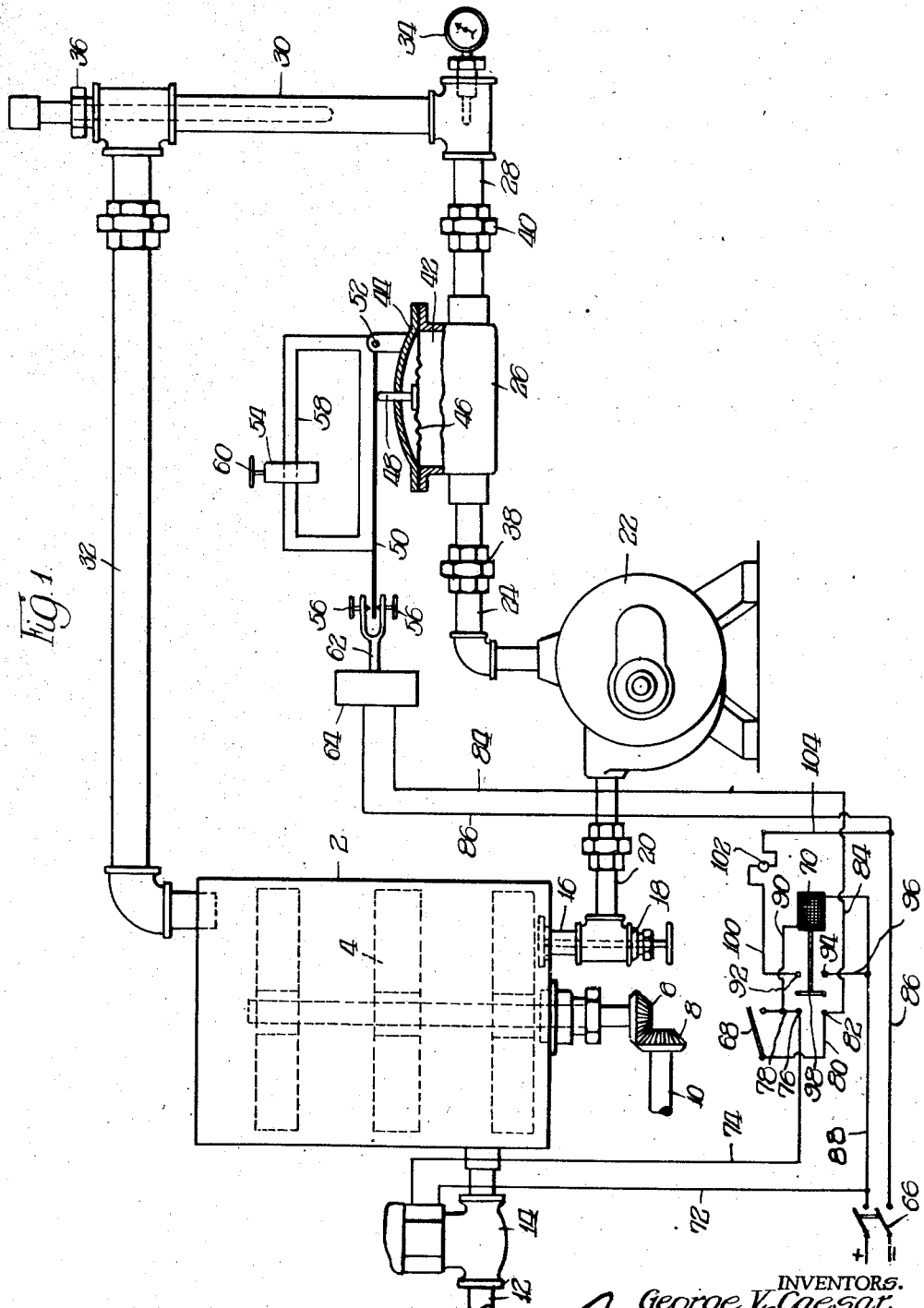

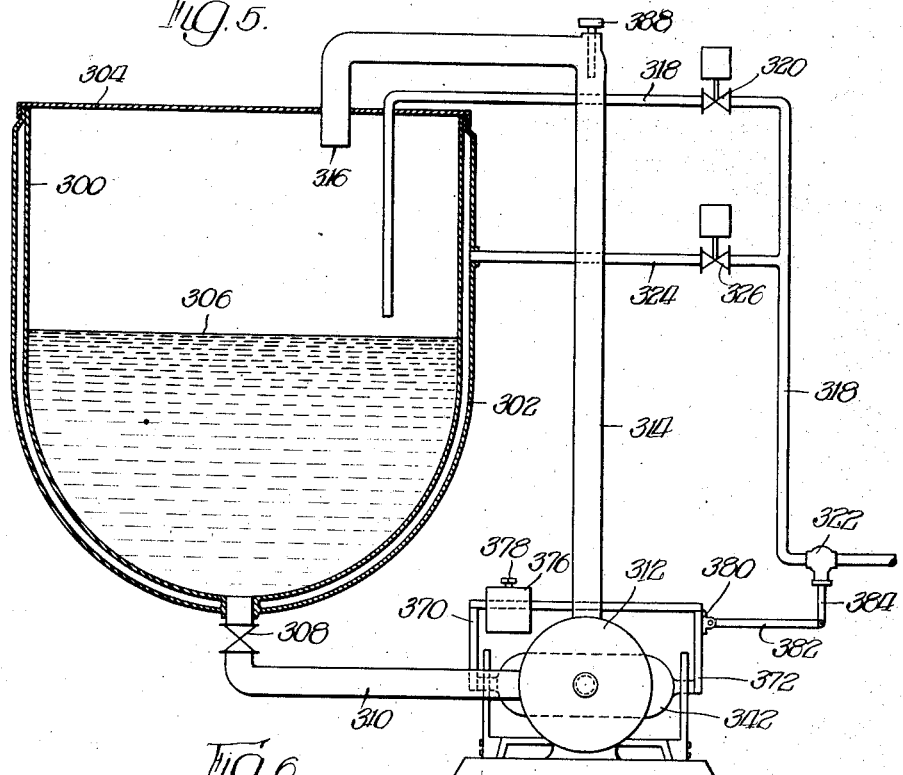
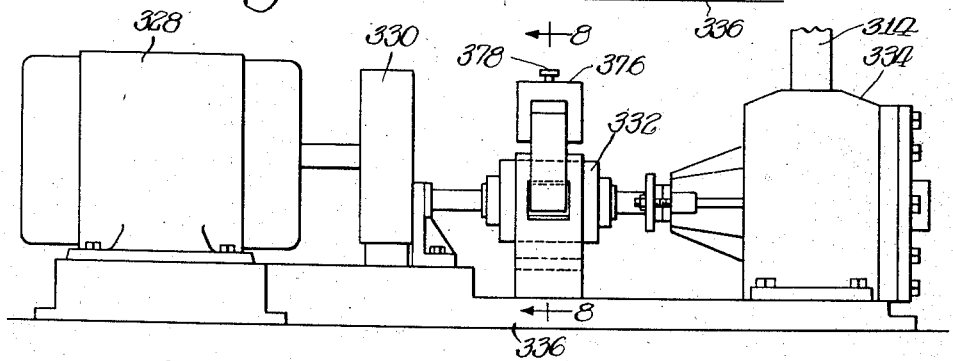
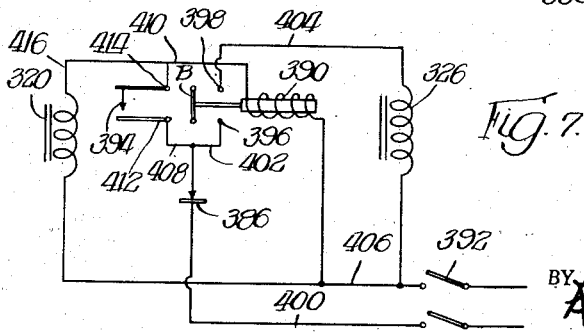

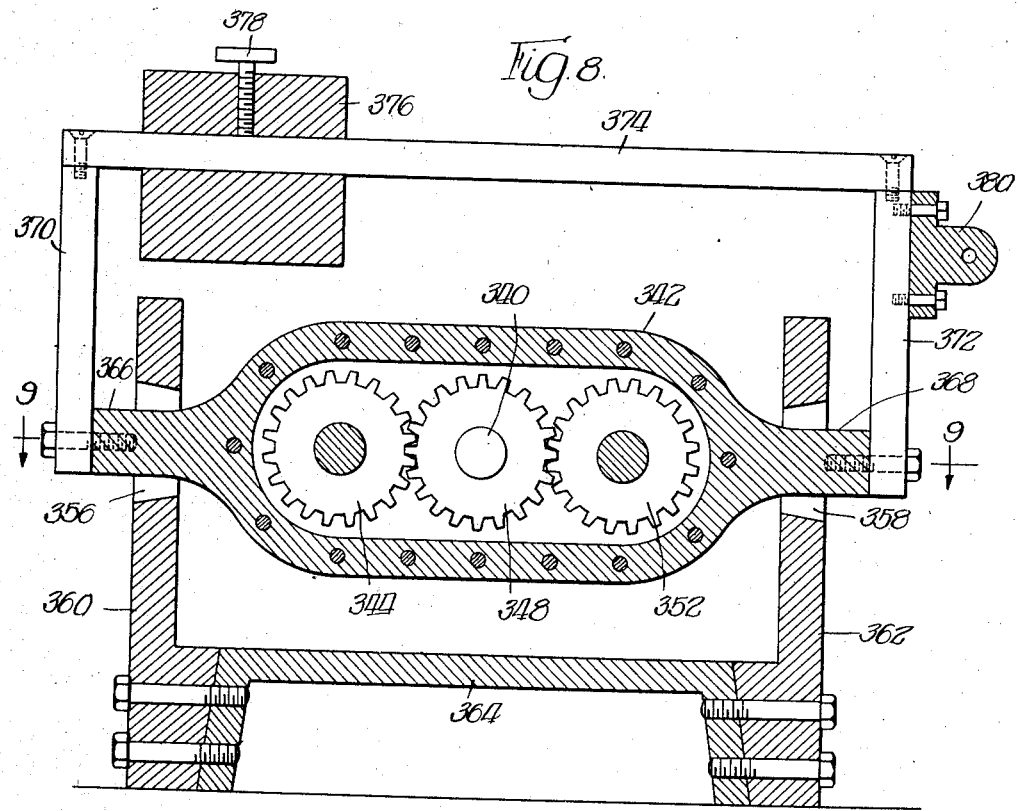
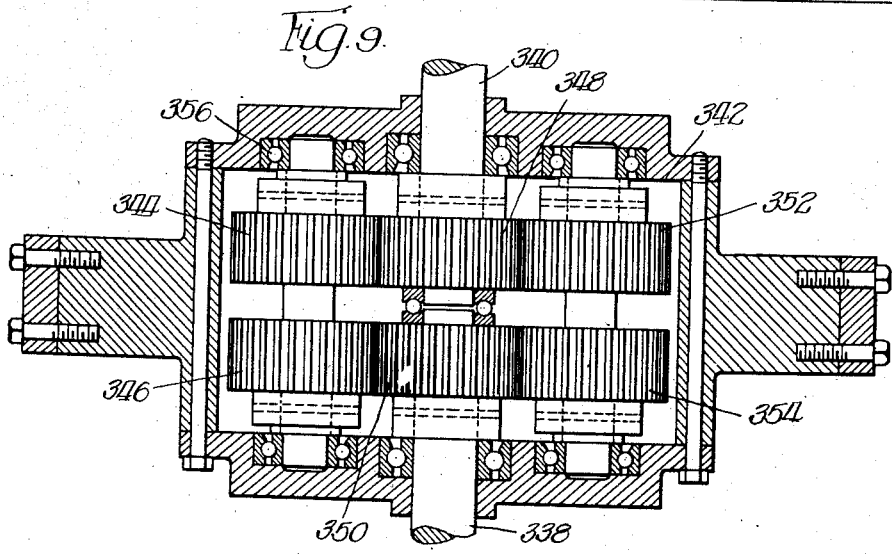

Patented July 27, 1943

2,325,573

UNITED STATES PATENT OFFICE 2,325,573

VISCOSITY RESPONSIVE APPARATUS

Thomas D. Thompson, Ridgefield Park, N. J., and George V. Caesar, Staten Island, N. Y., assignors to Stein, Hall & Company, Inc., New York, N. Y., a corporation of New York Application November 26, 1938, Serial No. 242,640

5 Claims. (Cl. 127—28)

This invention relates to a new and improved method and new and improved apparatus for controlling reactions involving a variation in viscosity.

The commercial and technical need of some positive, compact and economical device to utilize viscosity or consistency as a means of processing control in a wide range of applications and to do it automatically or semi-automatically is pressing. Various ingenious devices have been suggested and some of them have found useful special application. None of the known devices, to our knowledge, however, embraces the combination of positive controls and action peculiar to our invention as hereinafter described.

One of the objects of our invention is to provide a new and improved means for controlling automatically or semi-automatically various types of chemical reactions.

Another object is to provide a new and improved combination of automatic processing controls operated by variations in viscosity.

Still a further object is to provide a new and improved means for processing starch and other amylaceous materials. Other objects will appear hereinafter.

In accomplishing these objects in accordance with this invention, we provide a combination of automatic controls for reactions involving a variation in viscosity which includes a reaction vessel for holding the reaction mixture, a viscosity responsive means, means for circulating at least a portion of the reaction mixture in substantially non-pulsating flow under conditions adapted to cause said viscosity responsive means to operate with changes in viscosity, and means controlled by said viscosity responsive means to cause said reaction to be controlled according to variations in viscosity. Additionally, we have provided means for controlling chemical reactions jointly by viscosity responsive means and thermal responsive means.

In the practice of our invention we have developed several different types of apparatus for controlling chemical reactions in response to changes in viscosity. One of these types of apparatus, as hereinafter more fully described, is particularly advantageous for use where delicate control of chemical reactions in response to viscosity is desirable. This type of apparatus involves the use of a viscosity responsive means comprising a flexible diaphragm which is responsive to the pressure created by changes in viscosity of at least a portion of the reaction fluid circulating at an approximately constant rate of flow, the variation in pressure being a function of the viscosity or consistency of the fluid and the diaphragm being so arranged and constructed as to cause suitable relays or other motor actuated means to operate and thereby to control the input of heat and/or to add suitable quantities of liquids or chemicals for specific purposes.

Another type of apparatus which we provide in accordance with this invention is adapted particularly for use in conjunction with chemical reactions where the control required is not affected by relatively small or minute changes in viscosity. In this type of apparatus changes in viscosity are translated to a combination of controls by a suitable torque mechanism associated with the circulating system as more fully hereinafter described.

Other features and advantages of the invention will appear by reference to the accompanying drawings, in which:

Figure 1 represents diagrammatically one type of apparatus constructed in accordance with the principles of the present invention;

Figure 2 represents diagrammatically a modified form of apparatus which may be employed in accordance with this invention;

Figure 3 illustrates diagrammatically a wiring diagram to be used in conjunction with the construction shown in Figure 2;

Figure 4 illustrates partly in cross-section and with parts cut away a modified form of a viscosity responsive means which may be employed in accordance with this invention;

Figure 5 illustrates diagrammatically another form of apparatus which may be employed in accordance with this invention and in which the control of reactions is effected by a viscosity responsive torque mechanism;

Figure 6 illustrates in profile a portion of the apparatus shown in Figure 5;

Figure 7 shows a wiring diagram for a thermal control adapted to be used in conjunction with the apparatus shown in Figure 5;

Figure 8 is an enlarged cross-sectional view of the torque mechanism taken along the line 8—8 of Figure 6;

Figure 9 is a cross-sectional view looking down on that portion of the apparatus as shown in Figure 8 and taken along the line 9—9 of Figure 8.

The apparatus illustrated in Figure 1 comprises a reaction vessel 2 provided with a stirring device 4. Stirring device 4 is actuated by means of gears 6 and 8 connected by a drive shaft 10 to any suitable source of power, as, for instance, a motor or the like. Heat is supplied to reaction vessel 2 by means of a direct steam line 12 controlled by a valve 14 which, for the purpose of this invention, is preferably a solenoid valve or a motor actuated valve.

When a reaction mixture consisting of one or more substances in the form of a dispersion is introduced into vessel 2, a portion of said mixture may be recirculated from the bottom of vessel 2 through outlet 16 controlled by valve 18 into conduit 20, thence through a constant volume pump 22 and conduit 24 to a pressure viscosity control unit 26. From the pressure viscosity control unit 26, the liquid is passed through conduits 28, 30 and 32, and returned to reaction vessel 2. A thermometer 34 is provided to indicate the temperature of the circulating fluid at any time. A second thermometer 36 may be provided to aid in the control of the reaction. As illustrated, the various portions of the recirculating system are readily removable from each other. For instance, the viscosity control unit 26 may be removed from conduits 24 and 28 simply by unscrewing threaded unions 38 and 40.

Viscosity control unit 26 consists of a chamber 42 provided with a cap 44 and a flexible diaphragm 46, which is associated with a plunger 48. It will be understood that the size and shape of chamber 42 may be varied and if desired, it may conform generally to the dimensions of conduits 24 and 28.

Plunger 48 is associated with an arm 50 mounted on a fulcrum 52 and provided in any suitable manner with a weight 54 by means of which pressure may be exerted downwardly against plunger 48. The position of arm 50 and, correspondingly, the position of plunger 48 and of diaphragm 46 may be regulated to some extent by means of set screws 56, 56. Likewise the position of weight 54 on arm 58 may be regulated by sliding weight 54 from one position to another and fixing it in any one position by means of set screw 60. The forked arm 62, which carries set screws 56, 56 is also associated with an electrical switch 64 which may be, for example, a mercury switch, so that movement of arm 50 transmitted to arm 62 serves to open and close said switch.

As will be seen by reference to the wiring diagram shown in conjunction with the apparatus, valve 14 may be opened and closed by opening and closing switch 64.

Since switch 64 is automatically controlled by the movement of diaphragm 46, which in turn is responsive to changes in viscosity of the liquid being recirculated through the recirculating system, the supply of steam through valve 14 is directly controlled by changes in viscosity.

The operation of the apparatus is initiated by introducing the reacting materials into vessel 2 and starting agitator 4, then closing the main switch 66 and push button 68, thereby to complete a circuit for energizing in multiple the windings of magnetic valve 14 and relay 70. This circuit extends from the positive terminal of a suitable source of direct current supply, not shown, by way of conductor 72, through the windings of magnetic valve 14, conductor 74, contact 76, conductor 78, switch 68, conductor 80, contact 82, conductor 84, mercury switch 64, conductor 86 to the negative terminal of said source of direct current and from conductor 88 through the windings of relay 70 and conductor 90 to conductor 78, switch 68, conductor 80, contact 82, conductor 84, switch 64 and conductor 86 to the negative terminal of the source of current.

When energizing over the circuits traced above, valve 14 is opened and permits the entry of a direct source of heat, such as steam, into vessel 2. Relay 70, which normally makes contact between contacts 92 and 94, immediately breaks said contacts and makes contact with contacts 76 and 82, thus short circuiting push button switch 68 and causing the operation of steam valve 14 to become entirely automatic and depend only upon main circuit switch 66, which is normally closed, and mercury switch 64, which may be closed or open, depending upon the viscosity.

When the reaction mixture in vessel 2 has reached a suitable fluidity, pump 22 is started and valve 18 is opened, thereby causing a portion of the reaction mixture to be circulated in a confined stream at constant volume, regardless of viscosity, through the circulatory system comprising conduits 20, 24, 28, 30 and 32. As the reaction fluid circulates, it passes through viscosity control unit 26 and variations in viscosity cause variations in pressure upon diaphragm 46. Weight 54 is so adjusted that diaphragm 46 will not be raised or lowered, as the case may be, until a predetermined viscosity has been attained. Thus, if the reaction involves an increase in viscosity, weight 54 will be so adjusted that at predetermined viscosity the pressure caused by the liquid circulating through unit 26 will just be sufficient to raise diaphragm 46 and thereby raise arm 50 and cause switch 64 to open.

When switch 64 opens, it breaks the circuit through valve 14 and thereby causes valve 14 to close and at the same time causes relay 70 to restore. When relay 70 restores across contacts 92 and 94, a new circuit is established from the positive terminal of the source of current through conductor 88, conductor 96, contact 94, conductor 98, contact 92, conductor 100, electric signal 102, conductor 104 and conductor 86 to the negative terminal of the source of current. This causes signal 102 to give an alarm which may be a visible or audible alarm, and indicates that the viscosity has reached the desired predetermined point.

At this point the reaction may be completed or only partially completed, and further reacting materials may be added. The process may thereafter be repeated until the desired result has been reached.

The reaction may be one which involves a decrease in viscosity rather than an increase in viscosity, in which case the switch 64, closing valve 14, may be so arranged that the falling rather than rising of diaphragm 46 causes the opening of said switch.

If, in an operation of this type previously described, the viscosity increases so as to cause diaphragm 46 to rise and thereby open switch 64 but then later decreases, the construction shown is such that switch 64 will be closed by the falling of diaphragm 46, in which case a circuit would again be completed through the windings of magnetic valve 14 and said valve would again be open. At the same time the windings of relay 70 would be energized, breaking the circuit between contacts 92 and 94 and closing the circuit between contacts 76 and 82.

A somewhat different arrangement is shown in Figure 2 in which vessel 104 is provided with a cap 106 and jacket 108. The reaction mixture 110 is circulated through valve 112 by means of a constant volume pump 114 through a viscosity responsive means 116 of the character previously described, and thence through a conduit 118 past a thermal control means 120 to conduit 122, controlled by valve 124. From conduit 122 the recirculated mixture is returned to reaction vessel 104 through opening 126. If desired, instead of passing the mixture back into reaction vessel 104 it may be emptied into another vessel or container by means of conduit 128 controlled by valve 130. If it is desired to recirculate the mixture to the reaction vessel, valve 130 would normally be closed and valve 124 would be open, but where the mixture is not to be recirculated, valve 124 is closed and valve 130 is open, thus allowing the reaction products or reaction mixture to pass out through conduit 128.

As shown, in order to carry out the reaction, steam may be introduced through conduit 132 controlled by a motor actuated valve 134, such as, for example, a solenoid operated valve. An auxiliary steam line 136 runs to the jacket 108 of vessel 104 and may be opened and closed by an electrically operated valve such as a magnetic valve 138. The amount of steam passing to the jacket of said vessel 104 may also be regulated by an auxiliary valve 140.

The purpose of this type of apparatus is to provide a combination of means for controlling a reaction according to changes in viscosity or according to the temperature of the reaction mixture or for jointly controlling the reaction by variations both in viscosity and temperature.

The operation of this form of apparatus may be illustrated by reference to the wiring diagram shown in Figure 3. As illustrated, the operation of the apparatus is initiated by closing a main switch 142 and push button 144 thereby to keep a circuit for energizing in multiple the windings of magnetic valve 134 and relay 146. This circuit extends from a suitable source of current through conductor 156 to mercury thermal switches 154A and 154B. Reference numerals 162, 164, 166 and 168 represent contact points of a two pole double throw relay. Normally, when no current is flowing through coil 146 contacts 162 and 164 are connected through short circuiting bar A and form a continuous circuit through conductor 176, signal 170, conductor 174, magnetic valve 138 and conductor 172 to the other side of the line. This forms a simple thermal control circuit actuated in its entirety by mercury thermal switch 154B.

A companion circuit extends from switch 154A to contact 168 and to one terminal of a single pole push button switch 144. From contact 166 and one pole of the push button switch 144 the circuit extends to a pressure actuated mercury switch 116 generally illustrated in Figure 2. It will be understood that the diaphragm apparatus generally illustrated at 116 of Figure 2 may be substantially the same or similar to viscosity control unit 26 described in connection with Figure 1. From mercury switch 152 the aforesaid circuit extends through conductor 150, magnetic valve 134 and conductor 148 to the other side of the line. This circuit is inactive until push button switch 144 is closed, whereupon current flows through switch 144, conductor 160 and the coil of relay 146 to conductor 158 which connects to the other side of the line through conductor 148. Thus, closing push button switch 144 energizes coil 146 thrusting short circuiting bar A against contacts 166 and 168 whereupon push button 144 becomes inactive and may be relayed. As will be seen in the diagram, the circuit is now continuous from conductor 156 through thermal switch 154A, relay contacts 166 and 168, pressure actuated switch 152, conductor 150 and magnetic valve 134 to the other side of the line represented by conductor 148. As long as this circuit is not broken, valve 134 remains open and steam is admitted to reaction vessel 104.

In the meantime, a portion of reaction mixture 110 is constantly and uniformly circulated from the bottom of reaction vessel 104 through valve 112, pump 114, viscosity responsive apparatus 116, conduit 118, valve 124 and conduit 122, from whence it is returned to the reaction vessel through opening 126. As this portion of the reaction mixture is recirculated its viscosity will change from time to time as the reaction continues. For any particular reaction the diaphragm counterweight 178 is set at a given point in order to apply to the diaphragm contained in diaphragm mechanism 116, a given pressure. When the viscosity of the reaction mixture is such that there is sufficient pressure to actuate diaphragm mechanism 116, diaphragm switch 152 of Figure 3 is opened, thus breaking the circuit through magnetic valve 134 and shutting off the steam from reaction vessel 104. As soon as the viscosity falls to a point which lowers the pressure sufficiently to permit closing of viscosity responsive switch 152, the circuit through magnetic valve 134 is again closed, causing said valve to open. Should at any time during the operation the temperature rise to a point where mercury switch 154A is opened, then the entire circuit is broken, magnetic valve 134 closes and short circuiting bar A falls back to its normal position across contacts 162 and 164. This circuit then remains inoperative until push button 144 is again closed, repeating the cycle.

The other side of the circuit which is in operation when contacts 162 and 164 are closed by short circuiting bar A, is now operative and is designed to maintain any desired temperature in the process kettle which is controlled by means of thermal actuated switch 154B. Switch 154B, as it opens and closes, opens and closes magnetic steam valve 138, which in turn controls the admission of steam to jacket 108.

An alternate type of viscosity responsive means which may be employed in accordance with this invention is illustrated in Figure 4 and comprises a conduit 200, a flexible diaphragm 202 supported by supporting means 204 and by a cap 206 having therein an aperture 208. Connected to diaphragm 202 is an arm 210 which is associated at the other end with a balance arm 212 and may be adjusted with respect to said balance arm by means of a set screw 214. Balance arm 212 has a depending portion 216 which is connected by means of a pin 218 to a projecting portion 220, associated with a base plate 222. As will readily be seen, pin 218 acts as a fulcrum for balance arm 212. At one end balance arm 212 is provided with counterweight 224 having a set screw 226. At the other end it is provided with a depending weight 228 to which other weights 230 may be added in order to build up any desired amount of pressure on diaphragm 202.

An approximately constant volume of liquid circulating through conduit 200 is approximately tangential to and in contact with diaphragm 202. Hence, when the viscosity of such liquid increases to such a point that the pressure exerted against diaphragm 202 is greater than the downward pressure caused by weights 230, diaphragm 202 will be forced upwardly and this in turn will cause arm 210 to be forced upwardly and will raise arm 212.

Arm 212 is associated with a switch 232 which may be, for example, a mercury switch, so that when said switch is tilted, a contact is broken. Thus, switch 232 takes the place of switch 152 in the apparatus described in Figures 2 and 3 and takes the place of switch 64 in the apparatus in Figure 1.

It will be understood that other variations may be made in the apparatus described without departing from the invention. For instance, in Figure 1, a switch may be associated with thermal responsive means 36 and connected in series with switch 64. In this way valve 14 may be regulated or controlled both by the viscosity of the reaction mixture and by the temperature thereof. If the temperature becomes too high, the thermal responsive means would act to close valve 14. Likewise, if the viscosity becomes too high, the viscosity responsive means would act to close valve 14. Hence, said valve would be jointly controlled according to the viscosity of the reaction mixture and the temperature thereof.

For some purposes it is desirable to add other materials at a given stage in the process. This may be accomplished in Figure 1, for example, by the use of an auxiliary conduit, not shown, controlled by an electrically operated valve which occupies substantially the same position in the circuit illustrated in Figure 1 as electrically operated signal 102. Thus, when the viscosity or the temperature becomes too high, thereby causing valve 14 to close and relay 70 to restore, an auxiliary valve of the type described would be opened to introduce a predetermined quantity of water, or other material. All circuits herein described may be adapted for operation with either direct or alternating current. Similarly, other variations may be made without departing from the invention.

Referring to Figure 5, the apparatus illustrated comprises a reaction vessel 300 provided with a jacket 302 and a top 304. Vessel 300 is adapted to hold a reaction mixture 306. A portion of this mixture may be recirculated continuously or at intervals through a recirculating system comprising a valve 308, a conduit 310, a pump and torque mechanism generally illustrated at 312 and shown in more detail in Figure 6, and conduit 314. Conduit 314 returns the circulated fluid to the reaction vessel through opening 316. Steam is supplied to the reaction vessel through conduit 318 which is controlled by an electrically operated valve 320 and a mechanically operated valve 322. Conduit 318 leads to a source of steam not shown. Connecting conduit 318 with jacket 302 is a conduit 324 controlled by an electrically operated valve 326.

The pump and torque mechanism shown generally at 312 in Figure 5 and illustrated more specifically in Figure 6 comprises a motor 328 connected through a suitable reduction gear box 330 to a torque mechanism 332 and a pump 334. Conduit 310 of Figure 5 is connected to one side of pump 334 and conduit 314 to another side. Motor 328, reduction gear box 330, torque mechanism 332 and pump 334 may, if desired, all be mounted upon a common base 336.

The torque mechanism is illustrated more specifically in Figures 8 and 9. As shown in Figure 9, pump shaft 338 and motor shaft 340 are concentric and gear box 342 contains six gears, 344, 346, 348, 350, 352 and 354. All of these gears are run on regular thrust ball bearings such as illustrated at 356, and are enclosed in a bronze case in which they are immersed in oil. Figure 8 shows the complete mechanism in cross-section along the line of the pump and motor shafts except that steam valve 322 is not shown.

As illustrated in Figure 8, gear case 342 is free to move around the drive shaft of the motor and pump 338 and 340, respectively. The amount of movement is regulated by spaces 356 and 358 in members 360 and 362, respectively, which are mounted on a suitable base 364. As illustrated, gear case 342 is connected at its extremities 366 and 368 to members 370 and 372, which in turn are connected to a supporting bar 374 containing a counter balance or weight 376, which is adapted to move on said bar and is adjustable by means of a set screw 378. Mounted on member 372 is a connecting member 380 which, as shown in Figure 5, is connected by means of a pin or other suitable means to a connecting rod 382. Connecting rod 382 in turn is pivotally connected to connecting rod 384, which in turn is connected to valve 322. Thus, any movement of gear case 342 is translated through connecting rods 382 and 384 to valve 322.

The operation of this apparatus is based upon the principle that the torque imparted to gear case 322 by rotation of the six gears therein caused by motor 328 will vary with changes in viscosity of the reaction mixture being pumped through pump 334. This variation in torque causes the gear box 342 to move clockwise or counterclockwise, as the case may be, and this movement is translated to steam valve 322 in the manner previously described. In this way control of the chemical reactions in vessel 300 is made responsive to the viscosity. It will be understood, of course, that it is not absolutely essential that valve 322 be a mechanically operated valve. It may be an electrically operated valve actuated by a switch, which in turn is actuated by movement of gear box 342. Other changes may be made in the apparatus described without departing from the invention. This form of apparatus is particularly adapted for the processing of very heavy starch mixtures, although it may be used in many other applications. The apparatus described with reference to Figures 1 to 4, on the other hand, is especially adapted for chemical reactions where there is a relatively low concentration of reactants.

In addition to the viscosity responsive control means previously described we preferably provide the apparatus of Figure 5 with a thermal responsive means adapted to control the reaction according to operating temperature conditions. The operation of the thermal responsive means may be illustrated by reference to Figure 7 in which thermal switch 386 is controlled and operated by thermocouple 388, the later being in contact with the recirculating reaction mixture carried in conduit 314.

As shown in Figure 7, the wiring diagram includes a relay 390 and the two magnetic valves 320 and 326 also shown in Figure 5. The electrical circuit of Figure 7 is controlled by two switches, a main line swtich 392 and a push button switch 394. In normal position short circuiting bar B of relay 390 connects contacts 396 and 398, thus establishing a circuit from a source of electrical current, not shown, through switch 392, conductor 400, thermal switch 386, conductor 402, contacts 396 and 398, conductor 404 and the coils of valve 326 to conductor 406 on the other side of the line. Thus, in normal position valve 326 is open and is controlled entirely by thermal switch 386.

A companion circuit from a source of current through switch 392, conductor 400, thermal switch 386, conductor 408, switch 394, conductor 410 and the coils of relay 390 is connected to the other side of the line through conductor 406. In this circuit closing of push button 394 causes a current to flow through the coils of relay 390 thereby energizing said relay and causing short circuiting bar B to be thrust forward against contacts 412 and 414, whereupon push button 394 becomes inactive and may be released.

In this manner a circuit is established from a source of current through switch 392, conductor 400, thermal switch 386, conduits 408, contacts 412 and 414, conductor 416, the coils of electrical magnetic valve 320 and conductor 406 to the other side of the line. Energizing this circuit by pushing push button 394 causes valve 320 to open. This valve will remain open until the circuit is broken by thermal switch 386.

Operation of the apparatus establishes joint temperature and viscosity control of various types of given reactions. The supply of steam may be varied in response to viscosity by means of valve 322 and the temperature may be controlled by valves 320 and 326 in accordance with thermal requirements. Thermal switch 386 comprises two switches similar to thermal switches 154A and 154B described with reference to Figure 3. Hence, when thermal requirements reach a certain point the direct supply of steam is cut off by closing valve 320 of Figure 5, thus breaking the circuit through relay 390 and causing an indirect supply of steam to be admitted through valve 326. At the same time both the direct and indirect steam supply are controlled in response to viscosity by valve 322.

As a specific and original use of the apparatus described in Figure 1 we cite the following example of its application to the enzyme conversion of a starchy product, a process which normally requires much experience and close supervision.

*Example*

A suitable kind and quantity of an amylase is added to the desired concentration of a starch slurry in a tank equipped with an agitator and suitably heated. The apparatus of our invention is connected to the tank so as to circulate an approximately constant volume of the slurry. Heating of the slurry is begun and the diaphragm of our control device is weighted so as to shut off the heating automatically when the circulating paste reaches any given viscosity. In this manner the amylase is allowed to degenerate the gelatinized starch, thinning it as it gelatinizes. When thin enough, the diaphragm collapses and heating is resumed until the viscosity increases sufficiently to distend the diaphragm and again to shut off the heat. In this manner, and particularly with high solid concentrations, the input of heat proceeds by a series of automatically controlled steps, preventative of agitation difficulties and the slippage of pulleys, until the starch conversion product becomes too fluid to operate the diaphragm under its initial external loading. The temperature of the circulating fluid then is allowed to rise to the optimum converting temperature of the amylase when the heat input is thermostatically shut off, a visible and/or audible signal is given and the operator tests the viscosity of the liquid gum. If the viscosity is still above the desired degree, the diaphragm is then reset under a light external load, once again expanding it and stopping further input of heat until thinning proceeds to the desired degree. At this point the final collapse of the diaphragm actuates an audible and/or visible signal, and if the viscosity has reached the desired degree, the operator then inactivates the amylase. Once this final weighting of the diaphragm has been determined by experiment, further conversions proceed with minimum operating attention.

The above example is cited only by way of specific illustration of one of the commercially useful applications of the combinations of controls comprising the apparatus of our invention and is not to be understood as in any way limiting its scope. The various uses to which starch and its derivatives are applied usually require as close as possible viscosity or consistency control. Our combination of controls is easily adaptable to any substance capable of viscous or plastic flow and varying in viscosity or plasticity as a function of temperature or dilution. While especially applicable to starches and starch derivatives, the invention may also be employed in processing oils, fats, paints, glues, chemicals, etc.

Having thus described the invention, what we claim as new and desire to secure by Letters Patent of the United States is:

1. A viscosity controlled regulating apparatus for carrying out a starch conversion reaction characterized by a variation in viscosity comprising, in combination, a reaction chamber for holding a starch conversion reaction mixture, means for circulating at least a portion of said reaction mixture through a pump, a torque mechanism operatively associated with said pump and responsive to changes in viscosity of said circulating reaction mixture, and means responsive to the operation of said torque mechanism to cause said starch conversion reaction to be controlled according to changes in viscosity.

2. A viscosity controlled regulating starch conversion apparatus comprising, in combination, a chamber for holding a starch conversion reaction mixture, means comprising an external circulating system for withdrawing a portion of the reaction mixture from one part of the chamber and returning it to another part of said chamber, a pump in said external circulating system adapted to circulate the starch conversion reaction mixture through said system during the course of the starch conversion reaction while maintaining substantially non-pulsating flow, a viscosity responsive means associated with said pump, and means controlled by said viscosity responsive means to cause said starch conversion reaction to be controlled according to variations in viscosity.

3. A viscosity controlled starch conversion regulating apparatus comprising, in combination, a reaction chamber for holding a liquid phase starch conversion reaction mixture, an outlet in the lower part of said reaction chamber, an inlet in the upper part of said chamber, circulating means for withdrawing a confined stream of said starch conversion mixture from said outlet and returning it to said inlet, a viscosity responsive means operatively associated with said circulating means, and means controlled in response to said viscosity responsive means to cause said starch conversion reaction in said main reaction chamber to be controlled according to variations in viscosity.

4. A viscosity controlled starch conversion regulating apparatus comprising, in combination, a reaction chamber for holding a liquid phase starch conversion reaction mixture, circulating means for withdrawing a confined stream of said starch conversion mixture from one part of said reaction chamber and returning it to another part of said chamber, said circulating means comprising a pump, a viscosity responsive mechanism operatively associated with said pump actuated in response to variations in the viscosity of the circulating reaction mixture, and means controlled by said viscosity responsive means to cause said starch conversion reaction to be controlled according to variations in viscosity.

5. A viscosity controlled liquid phase starch conversion regulating apparatus comprising, in combination, a reaction chamber for holding a liquid phase starch conversion reaction mixture, circulating means for circulating a portion of the reaction mixture in a confined stream from one part of said reaction chamber to another out of contact with the main reaction mixture, said circulating means comprising a pump, a viscosity responsive device operatively associated with said circulating means and responsive to changes in the viscosity of the circulating reaction mixture, adjustable means associated with said viscosity responsive device to cause the same to be actuated only at a predetermined viscosity of said circulating reaction mixture, and means controlled by said viscosity responsive device to cause said starch conversion reaction to be controlled when said predetermined viscosity is attained.

THOMAS D. THOMPSON.
GEORGE V. CAESAR.